United States Patent
Okada et al.

(10) Patent No.: US 8,370,021 B2
(45) Date of Patent: Feb. 5, 2013

(54) OBSTACLE DETECTING DEVICE

(75) Inventors: Yoshihisa Okada, Kariya (JP);
Toshiyuki Konishi, Anjo (JP); Hideki Hioki, Ichinomiya (JP); Yohei Nakakura, Anjo (JP)

(73) Assignee: Denso Corporation, Kariya (JP)

( * ) Notice: Subject to any disclaimer, the term of this patent is extended or adjusted under 35 U.S.C. 154(b) by 597 days.

(21) Appl. No.: 12/592,874

(22) Filed: Dec. 3, 2009

(65) Prior Publication Data
US 2010/0145617 A1 Jun. 10, 2010

(30) Foreign Application Priority Data
Dec. 4, 2008 (JP) ................... 2008-310110

(51) Int. Cl.
*G05D 1/02* (2006.01)

(52) U.S. Cl. ............. 701/36; 340/436; 701/300; 701/45

(58) Field of Classification Search .................. 701/300, 701/45, 301, 49; 356/4.01; 340/436, 555; 296/146.1
See application file for complete search history.

(56) References Cited

U.S. PATENT DOCUMENTS

| | | | | |
|---|---|---|---|---|
| 6,160,479 A | * | 12/2000 | Åhlen et al. | 340/555 |
| 7,193,509 B2 | * | 3/2007 | Bartels et al. | 340/436 |
| 7,630,806 B2 | * | 12/2009 | Breed | 701/45 |
| 7,734,417 B2 | * | 6/2010 | Chinomi et al. | 701/301 |
| 7,783,403 B2 | * | 8/2010 | Breed | 701/45 |
| 7,852,462 B2 | * | 12/2010 | Breed et al. | 356/4.01 |
| 2008/0030045 A1 | * | 2/2008 | Lai et al. | 296/146.1 |
| 2009/0033477 A1 | * | 2/2009 | Illium et al. | 340/436 |
| 2010/0076651 A1 | * | 3/2010 | Nakakura et al. | 701/49 |
| 2010/0082206 A1 | * | 4/2010 | Kollar et al. | 701/49 |

FOREIGN PATENT DOCUMENTS

| | | | |
|---|---|---|---|
| JP | 2005153758 A | * | 6/2005 |
| JP | 2007-176293 | | 7/2007 |
| JP | 2007176293 A | * | 7/2007 |

\* cited by examiner

*Primary Examiner* — Thomas Black
*Assistant Examiner* — Robert Payne
(74) *Attorney, Agent, or Firm* — Harness, Dickey & Pierce, PLC

(57) ABSTRACT

A distance measuring sensor is arranged to a vehicle door, and measures a distance to an object in a direction corresponding to a scanning angle. A memory stores a standard angle and a comparison distance corresponding to the scanning angle. A distance-shortest scanning angle is defined by the shortest value of the measured distance. When the distance-shortest scanning angle is different from the standard angle, the scanning angle is corrected. The object is determined to be an obstacle having a possibility to contact with the door, when the measured distance is equal to or shorter than a corrected comparison distance corresponding to the corrected scanning angle.

9 Claims, 13 Drawing Sheets

| θ | X | L | COMPARISON RESULT | OBSTACLE |
|---|---|---|---|---|
| θ1 | X1 | L1 | X1>L1 | ABSENT |
| θ2 | X2 | L2 | X2<L2 | PRESENT |
| θ3 | X3 | L3 | X3>L3 | ABSENT |
| ... | ... | ... | ... | ... |
| θn | Xn | Ln | Xn>Ln | ABSENT |

OBSTACLE DETECTING DEVICE

CROSS REFERENCE TO RELATED APPLICATION

This application is based on Japanese Patent Application No. 2008-310110 filed on Dec. 4, 2008, the disclosure of which is incorporated herein by reference in its entirety.

BACKGROUND OF THE INVENTION

1. Field of the Invention

The present, invention relates to an obstacle detecting device.

2. Description of Related Art

JP-A-2007-176293 discloses an obstacle detecting device having plural distance measuring sensors. A door mirror is arranged on a swing door of a vehicle, and the sensors are mounted on a back face side of a support axis of the door mirror. The sensors are distanced from each other in a direction of the support axis corresponding to an up-down direction. Each of the sensors has a predetermined detection area adjacent to the door, and the predetermined detection area is constructed by a predetermined plane. The sensor detects presence or absence of an obstacle in the detection area, and determines a position of the obstacle when the presence of the obstacle is detected. When the obstacle is detected by the sensor, an open degree of the door is limited, so as to prevent a collision between the door and the obstacle.

The sensor is required to be accurately mounted to the door mirror. However, when the mounting position of the sensor deviates from a target position, the detection area deviates from a target area. In this case, detection accuracy may be decreased. The deviation of the mounting position may be generated in a vehicle producing process or a vehicle using time.

It is difficult to accurately mount the device to the door mirror. Further, even when the mounting is performed with many man-hours so as to accurately mount the device, the deviation of the mounting position may be generated in the vehicle using time after the vehicle producing process.

SUMMARY OF THE INVENTION

In view of the foregoing and other problems, it is an object of the present invention to provide an obstacle detecting device.

According to an example of the present invention, an obstacle detecting device includes a distance measuring sensor, a memory, an initializing portion, a correcting portion and an object determining portion. The distance measuring sensor is arranged adjacent to a rotation axis of a door of a vehicle, and measures a distance to an object in a direction corresponding to a scanning angle by scanning a scanning plane. The memory stores a standard scanning angle defined when the sensor is mounted at a normal position, and a comparison distance defined between a mounting position of the sensor and an end of the door in the direction corresponding to the scanning angle. The initializing portion obtains a distance-shortest scanning angle defined by a shortest value of the measured distance. The correcting portion corrects the scanning angle, when the distance-shortest scanning angle is different from the standard scanning angle. The object determining portion determines the object to be an obstacle having a possibility to contact with the door, when the measured distance is equal to or shorter than a corrected comparison distance corresponding to the corrected scanning angle.

Accordingly, detection accuracy can be maintained high.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

An obstacle detecting device 1 will be described with reference to FIGS. 1 and 2.

Figure 1:
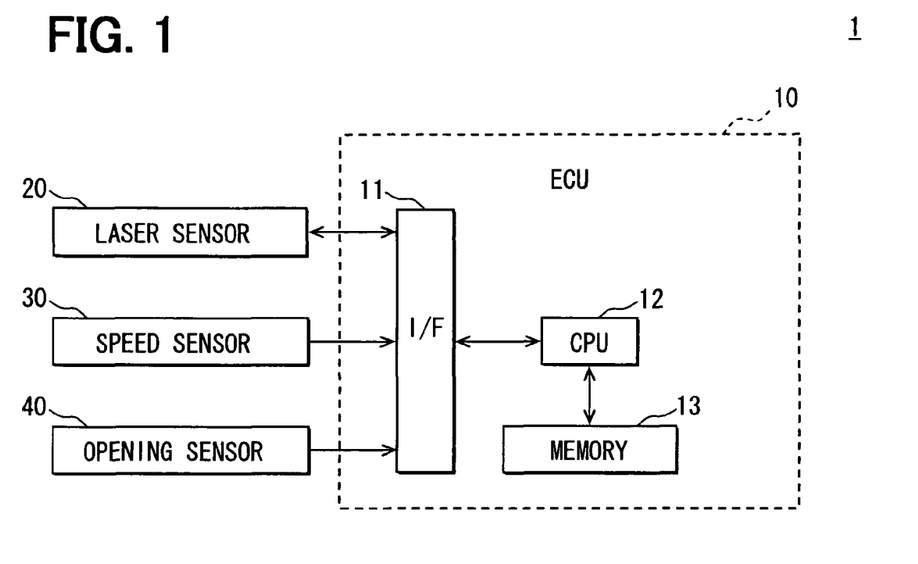
FIG. 1 is a block diagram illustrating an obstacle detecting device according to a first embodiment.

As shown in FIG. 1, the device 1 includes an electronic control unit 10 (ECU), a laser sensor 20, a vehicle speed sensor 30 and an opening sensor 40. The ECU 10 performs a variety of controlling processes. The laser sensor 20 measures a distance between the laser sensor 20 and an object to be detected. The speed sensor 30 detects a speed of a vehicle, when the device 1 is mounted on the vehicle. The opening sensor 40 detects an opening degree of a door 50 of the vehicle shown in FIG. 3, for example.

The laser sensor 20 includes a light emitting element 22 shown in FIG. 2, a light receiving element 23 shown in FIG. 2, a scanner to be described below, and a control circuit (not shown). The light emitting element 22 is mounted to a lower part of a door mirror of the door 50, for example, and emits laser light. The scanner changes a radiation direction of the laser light in a predetermined plane, and scans the plane by using the laser light. The light receiving element 23 receives light reflected by an object. The control circuit calculates the distance to the object based on a time passage from the emitting of light to the receiving of light.

Figure 2:
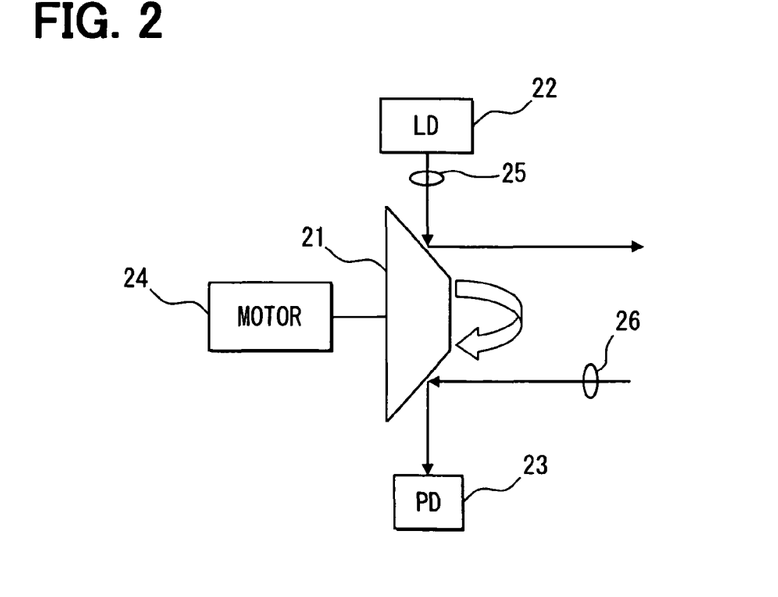
FIG. 2 is a schematic view illustrating a laser sensor of the device.

As shown in FIG. 2, the scanner of the laser sensor 20 includes a mirror 21, a motor 24, a first lens 25 and a second lens 26. The mirror 21 has an approximately column shape. A first end face of the mirror 21 has a first reflection face to reflect laser light radiated from the light emitting element 22, and a second end face of the mirror 21 has a second reflection face to reflect laser light reflected by an object toward the light receiving element 23. The motor 24 rotates the mirror 21 with respect to a rotation axis passing through the first and second reflection faces. The first lens 25 is designed in a manner that laser light forms a beam and has a predetermined spreading angle. The second lens 26 gathers and collects light to be received by the element 23.

Thus, the scanner emits plural laser lights to scan a plane having a center corresponding to the rotation axis. When the laser sensor 20 detects an object, a distance between the laser sensor 20 and the detected object is output into the ECU 10. A scanning plane and a scanning area of the laser sensor 20 will be described with reference to FIGS. 3 and 4 below. The laser sensor 20 may correspond to a distance measuring sensor.

The speed sensor 30 is connected to the ECU 10, and outputs a speed signal representing a driving speed of the vehicle to the ECU 10. The opening sensor 40 detects an opening degree of the door 50, when the door 50 is opened. The opening sensor 40 is connected to the ECU 10, and outputs a detection signal representing the opening degree into the ECU 10. The opening sensor 40 may be changed to a courtesy switch to detect the door 50 to be opened or closed.

As shown in FIG. 1, the ECU 10 includes an input interface 11 (I/F), a CPU 12 and a nonvolatile memory 13. The I/F 11 receives signals from the laser sensor 20, the speed sensor 30 and the opening sensor 40. The CPU 12 performs a variety of calculation processes based on a predetermined program. The memory 13 memorizes the program and data to be used for detecting object.

Figure 3:
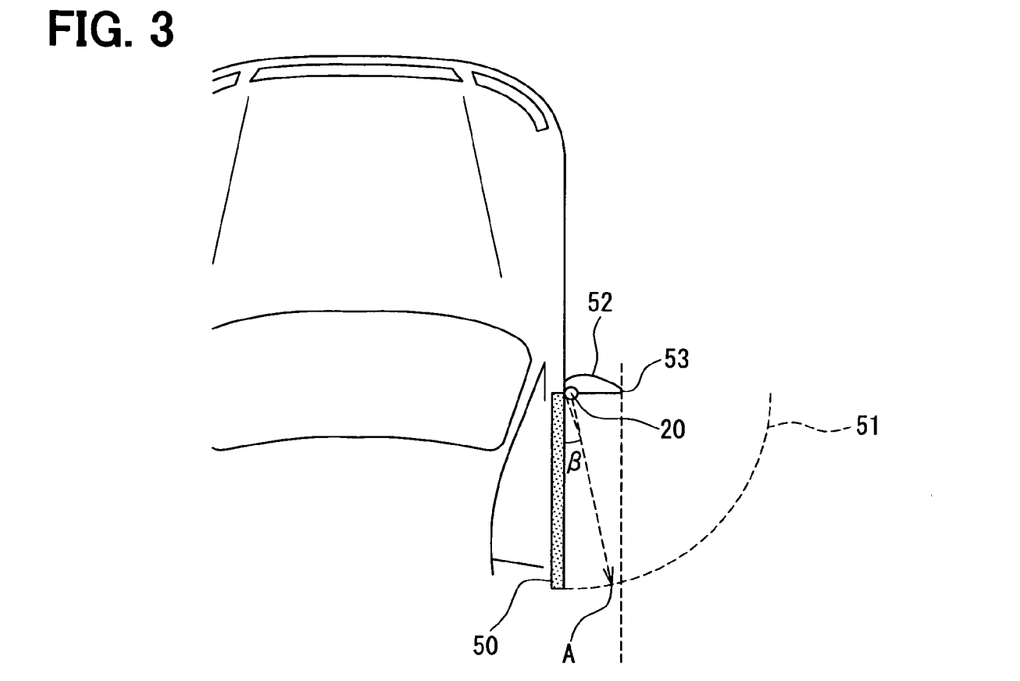
FIG. 3 is a plan view illustrating a scanning plane of the sensor.
Figure 4:
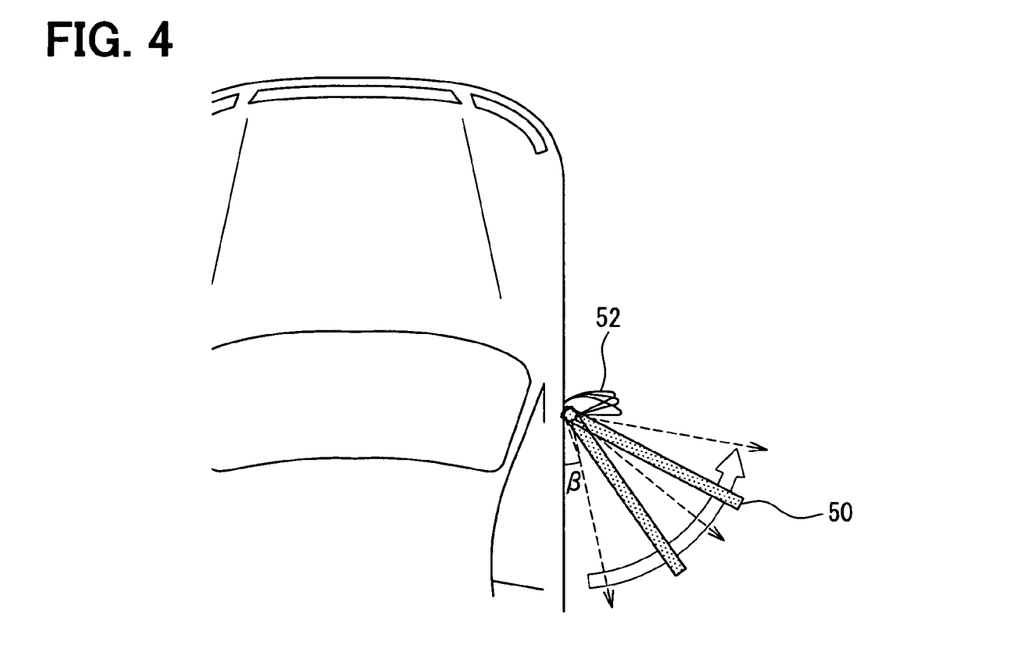
FIG. 4 is a plan view illustrating displacements of the scanning plane.
Figure 5:
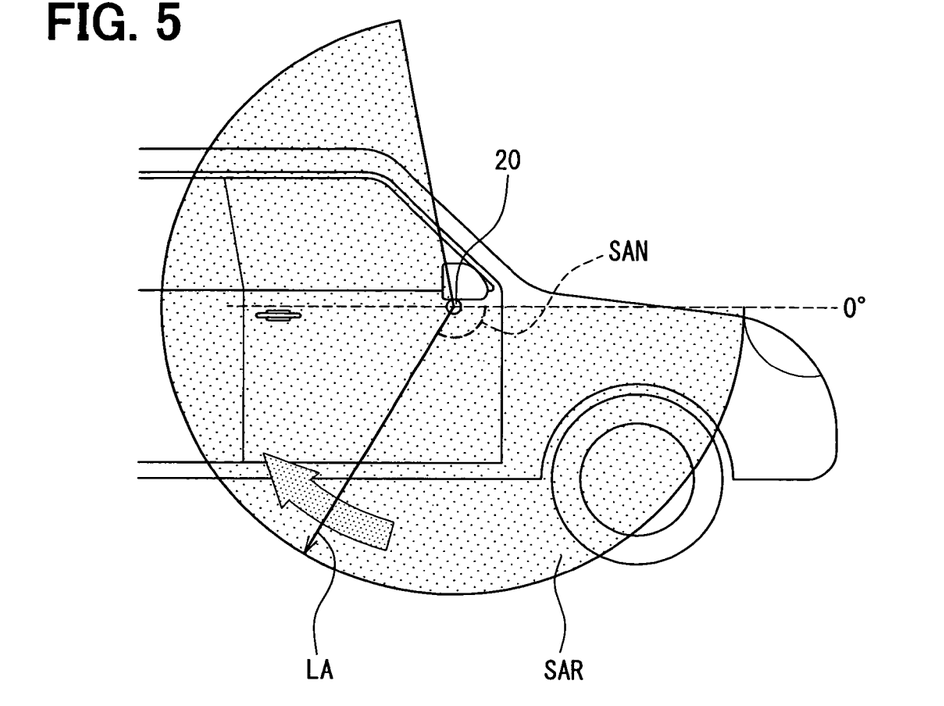
FIG. 5 is a side view illustrating a vertical scanning area of the sensor.

A scanning plane and a scanning area of laser light emitted from the laser sensor 20 will be described with reference to FIGS. 3, 4 and 5. FIG. 3 shows the scanning plane of laser light, when the laser sensor 20 emits the laser light. FIG. 4 shows displacements of the scanning plane to maintain a predetermined angle β relative to the door 50, when the door 50 is opened. FIG. 5 shows a vertical scanning area SAR of the laser sensor 20.

As shown in FIG. 3, the laser sensor 20 has a scanning plane having a predetermined angle β relative to a surface of the door 50 in a door opening direction, when the laser sensor 20 is mounted to a lower part of the mirror 52. Laser light is emitted to scan the scanning plane in a vertical direction. The door 50 is rotatably supported by a support axis (not shown) of a side face of the vehicle, and an end of the door 50 forms an arc line by the rotation. That is, when the door 50 is opened, an outside end of the door 50 moves along a broken line 51 of FIG. 3. The broken line 51 represents a trace of the outside end of the door 50.

When the door 50 is closed, a cross point A of FIG. 3 is defined between the scanning plane and the broken line 51. A distance between the point A and the door 50 is set to be smaller than a distance between an outside end 53 of the mirror 52 and the door 50. Therefore, when an object exists in an area defined by the predetermined angle β from the door 50, the laser sensor 20 cannot detect the object. The door mirror 52 is typically arranged on the door 50, and the vehicle is parked in a manner that the mirror 52 disables to be contact with an object. Therefore, the laser sensor 20 can detect substantially all area around the laser sensor 20.

The scanning plane of the laser sensor 20 has the predetermined angle β from the door 50. Therefore, as shown in FIG. 4, while the door 50 is opened, the sensor 20 detects an object in a position proceeding than the door 50 by the predetermined angle β. That is, the laser sensor 20 detects an obstacle having possibility to contact with the door 50, in all movable area of the door 50.

FIG. 5 shows a scanning angle SAN of a scanning area SAR, when the laser sensor 20 is mounted at a normal position of a lower part of the mirror 52. The normal position is defined in a manner that a vehicle forward direction corresponds to a scanning angle of 0°, that a direction extending vertically downward from the laser sensor 20 corresponds to a scanning angle of 90°, and that a direction extending approximately upward from the laser sensor 20 corresponds to a scanning angle of 260°.

The scanning angle of 0° represents a start position of a scanning of the laser sensor 20, and the scanning angle of 260° represents an end position of the scanning of the laser sensor 20. Laser light LA is repeatedly emitted by a plural number of step angles θx clockwise from the start position to the end position. The scanning area SAR of the laser sensor 20 is defined by an area between the start position and the end position.

Because the laser sensor 20 scans the scanning plane and the scanning area SAR by using laser light LA, obstacle having possibility to contact with the door 50 can be detected relative to all surface of the door 50.

When the laser sensor 20 scans the scanning area SAR of FIG. 5, laser light LA may be reflected by a vehicle chassis other than the door 50, a ground or an object having no possibility to contact with the door 50, and the reflected light may be received by the laser sensor 20. Therefore, when the laser sensor 20 detects an object, the CPU 12 of the ECU 10 determines the object to exist in a movable area of the door 50 or not.

The memory 13 of the ECU 10 stores data to be used for the determination in advance so as to perform accurate determination. The data was obtained in advance in a case that the laser sensor 20 is mounted at the normal position. The data includes comparison distances Ln corresponding to comparison scanning angles θn. The distance Ln is defined between the mounting position of the laser sensor 20 and an end of the door 50, when laser light LA has the scanning angle θn.

Specific determination process will be described with reference to FIG. 6. The CPU 12 controls the laser sensor 20 to emit laser light LA having a scanning angle θ, and to receive light reflected by an object. The laser sensor 20 calculates a distance X to the object, and outputs the calculation result to the CPU 12. The CPU 12 extracts the comparison distance L corresponding to the scanning angle θ from the data stored in the memory 13. The calculated distance X and the extracted distance L are compared with each other.

When the calculated distance X is equal to or shorter than the extracted distance L, the object is determined to exist in the movable area of the door 50, and the object is determined to be an obstacle having a possibility to contact with the door 50. In contrast, when the calculated distance X is longer than the extracted distance L, the object is determined to exist out of the movable area of the door 50, and the object is determined to have no possibility to contact with the door 50. The CPU 12 may correspond to an object determining portion.

A determination example using the data stored in the memory 13 is described with reference to FIGS. 6 and 7.

Figure 6:
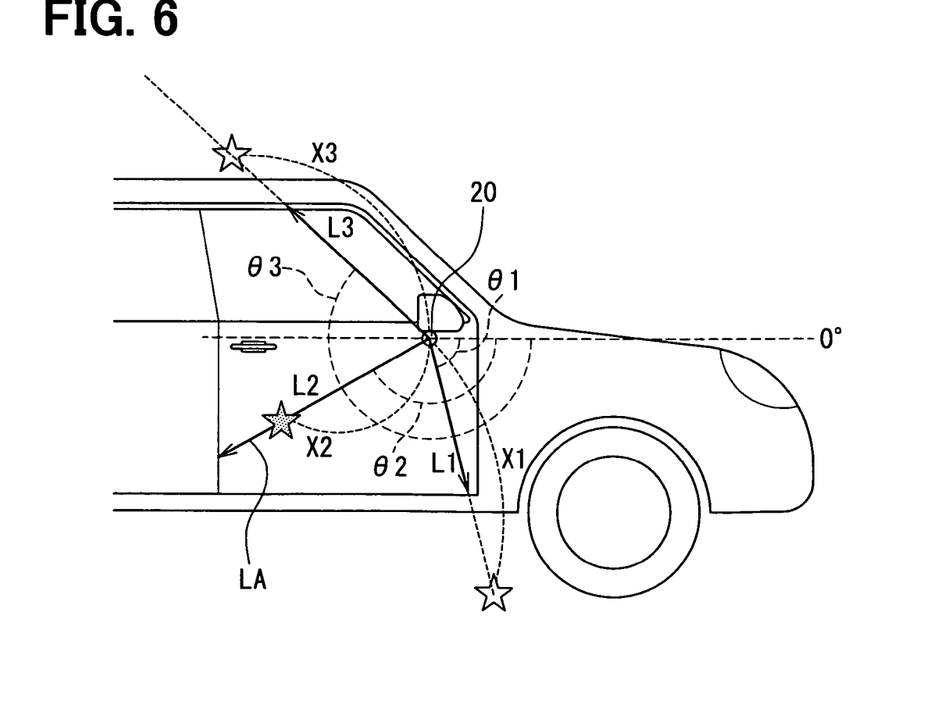
FIG. 6 is a side view illustrating a determination of the device.
Figure 7:
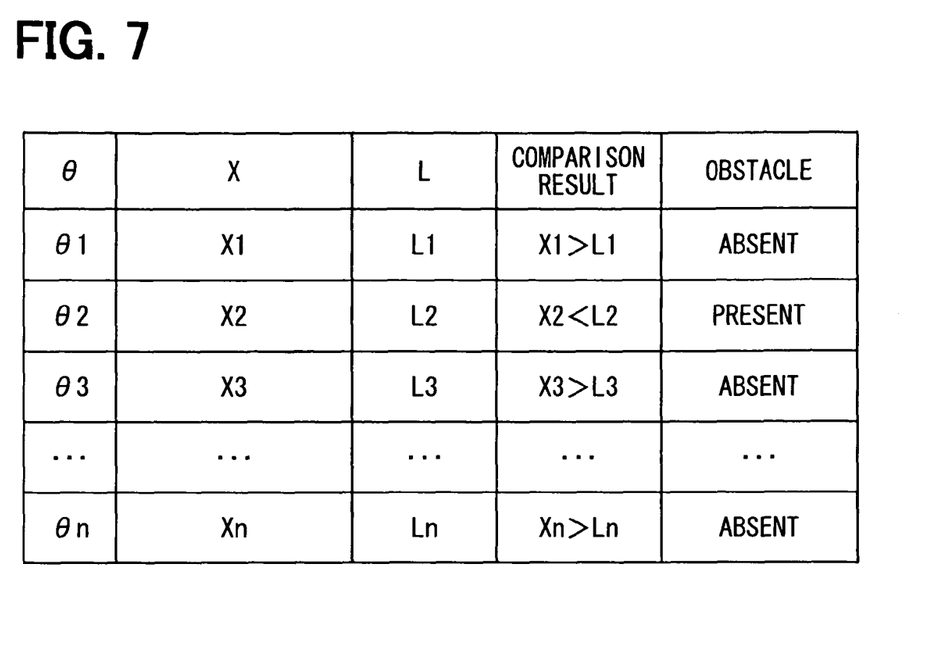
FIG. 7 is a view illustrating results of the determination.

As shown in FIG. 6, the laser sensor 20 calculates the distances X1, X2, X3 relative to the scanning angles θ1, θ2, θ3, respectively. As shown in FIG. 7, the CPU 12 compares the distances X1, X2, X3 with the distances L1, L2, L3 corresponding to the scanning angles θ1, θ2, θ3, respectively. As shown in FIG. 6, the distance L1, L2, L3 is defined between the mounting position of the laser sensor 20 and an edge of the door 50 in a direction of the scanning angle θ1, θ2, θ3.

In the example, the calculated distance X1, X3 is determined to be longer than the extracted distance L1, L3. Therefore, as shown in FIG. 7, an obstacle having the contacting possibility is not present in the scanning angle θ1, θ3. In contrast, the calculated distance X2 is determined to be shorter than the extracted distance L2. Therefore, as shown in FIG. 7, an obstacle having the contacting possibility is present in the scanning angle θ2, and the obstacle is defined by a star mark having dot-pattern of FIG. 6, for example.

Figure 8A:
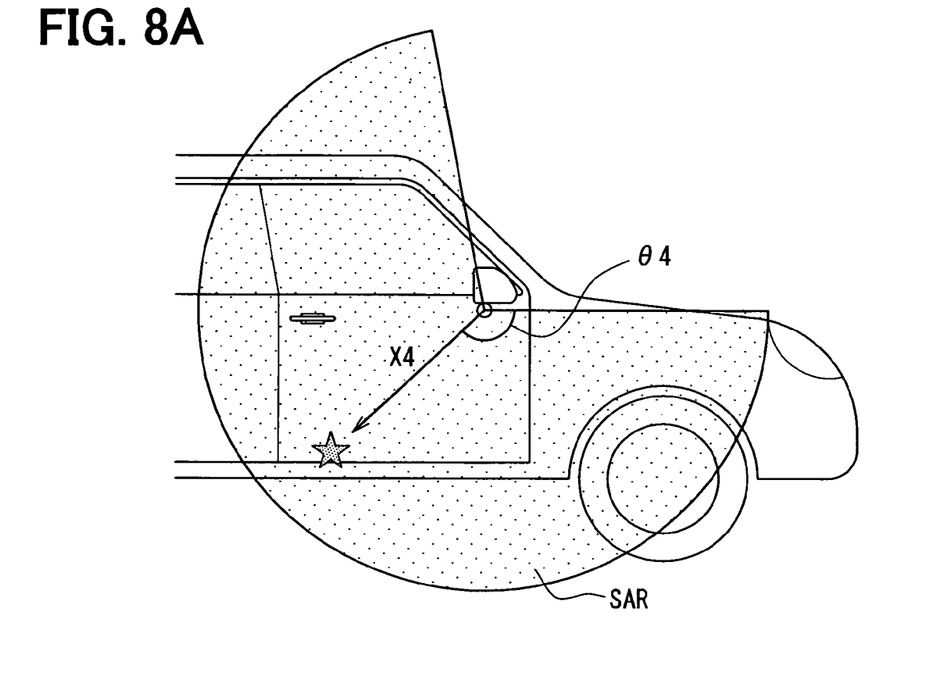
FIG. 8A is a side view illustrating a scanning area when the sensor is located at a normal position.
Figure 8B:
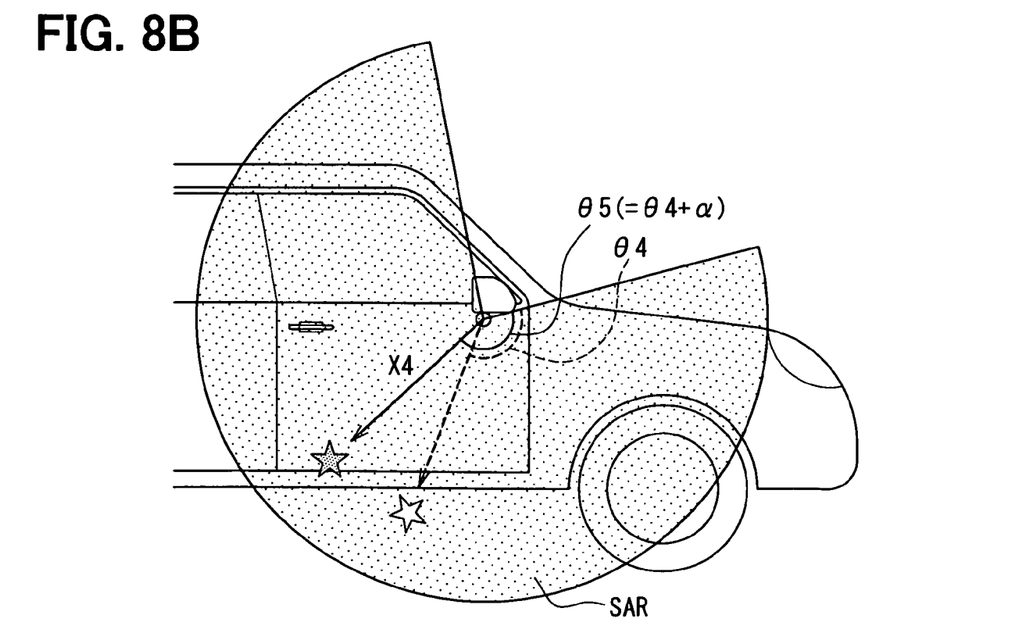
FIG. 8B is a side view illustrating a scanning area when the sensor is located at an abnormal position.

The laser sensor 20 may not accurately be mounted to the mirror 52 in producing time, or the mounting position of the sensor 20 may deviate in using time. A detection accuracy of the laser sensor 20 may be decreased by the deviation of the mounting position. An accuracy-decreasing example will be described with reference to FIGS. 8A and 8B. FIG. 8A shows a case in which the laser sensor 20 is mounted to a normal position. FIG. 8B shows a case in which the laser sensor 20 is mounted to an abnormal position.

When the laser sensor 20 is located at the normal position shown in FIG. 8A, the laser sensor 20 detects an object defined by a star mark of FIG. 8A in a scanning angle θ4, and calculates a distance X4 between the sensor 20 and the object. At this time, a position of the object represented by the start mark is in the movable area of the door 50. A comparison distance L4 is extracted from the data stored in the memory 13 based on the scanning angle θ4. When the CPU 12 compares the measured distance X4 with the extracted distance L4, the measured distance X4 is shorter than the extracted distance L4. Therefore, the CPU 12 determines the object to be an obstacle having a possibility to contact with the door 50.

When the laser sensor 20 is located at the abnormal position shown in FIG. 8B, the laser sensor 20 detects the same object defined by the star mark having dot-pattern in a scanning angle θ4+α, because the mounting position of the laser sensor 20 is different from the normal position by an angle of α. Therefore, the laser sensor 20 detects the same object in the scanning angle θ5=θ4+α.

The distance calculated by the CPU 12 has a value of X4, because the position of the object is the same between FIG. 8A and FIG. 8B. However, the CPU 12 extracts a comparison distance L5 corresponding to the scanning angle θ5 from the data stored in the memory 13. The CPU 12 compares the measured distance X4 with the extracted distance L5. In this case, the object may be erroneously determined to have no possibility to contact with the door 50.

Thus, in a case that the mounting position of the laser sensor 20 is different from the normal position, the extracted data may not correspond to the calculated result, because the extracted data is based on the laser sensor 20 mounted at the normal position. In this case, accuracy for determining the object to be in the movable area of the door 50 or not may be lowered. That is, detection accuracy may be lowered.

Figure 9A:
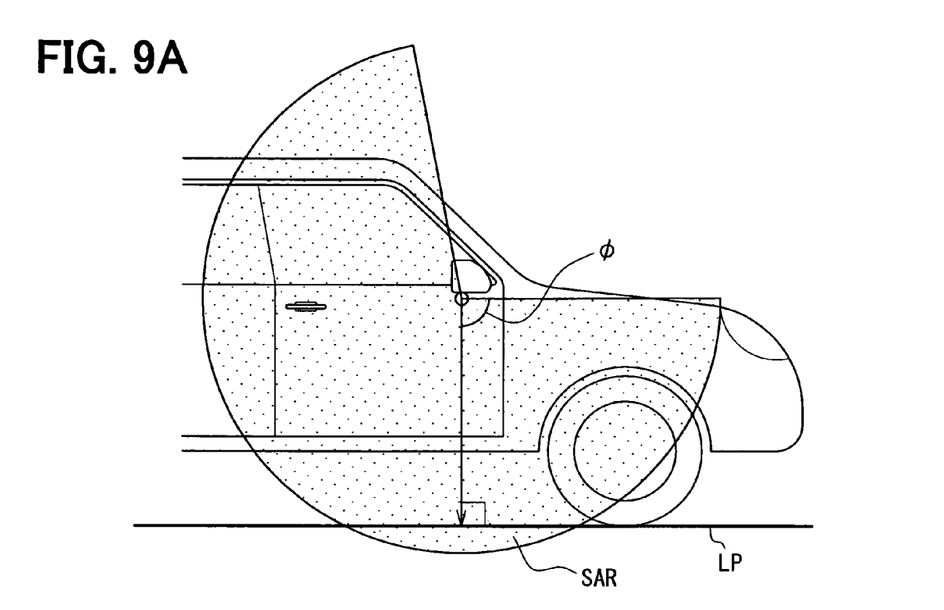
FIG. 9A is a side view illustrating a distance-shortest scanning angle when the sensor is located at the normal position.

In contrast, according to the first embodiment, as shown in FIG. 9A, the CPU 12 obtains a distance-shortest scanning angle φ corresponding to a direction extending vertically downward from the sensor 20. Further, the scanning angle θ of laser light emitted from the laser sensor 20 is corrected by using the distance-shortest scanning angle φ.

Figure 9B:
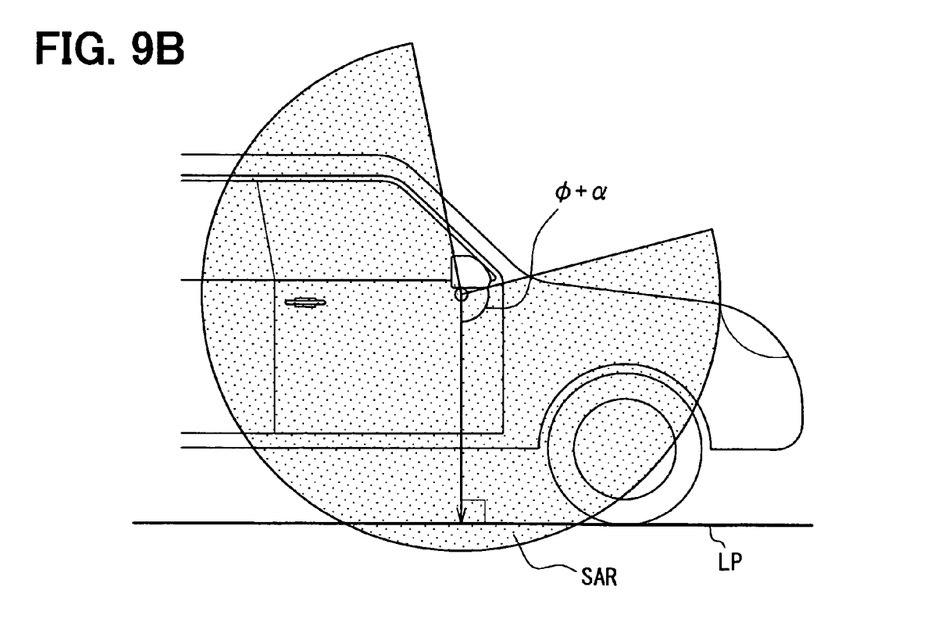
FIG. 9B is a side view illustrating a distance-shortest scanning angle when the sensor is located at the abnormal position.
Figure 10:
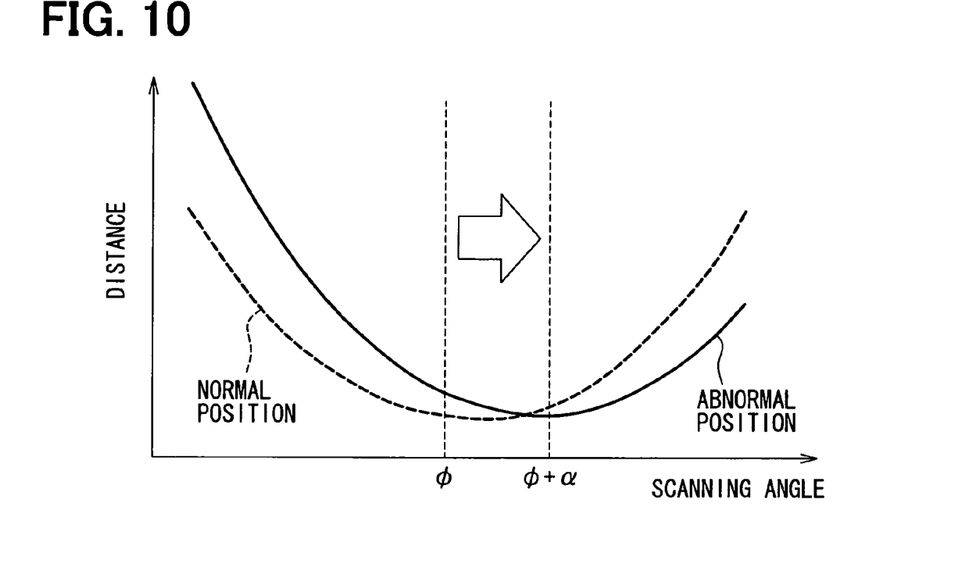
FIG. 10 is a graph illustrating a relationship between a scanning angle and a distance measured by the sensor, in a case of the normal position and in a case of the abnormal position.

The distance-shortest scanning angle φ will be described with reference to FIGS. 9A, 9B and 10. FIG. 9A shows a distance-shortest scanning angle φ when the laser sensor 20 is located at the normal position, and FIG. 9B shows a distance-shortest scanning angle φ+α when the laser sensor 20 is located at the abnormal position. FIG. 10 shows a comparison of scanning results between the case when the laser sensor 20 is located at the normal position and the case when the laser sensor 20 is located at the abnormal position.

As shown in FIG. 10, the distance-shortest scanning angle φ is a scanning angle defined when the laser sensor 20 detects the distance to become the shortest in a case that the laser sensor 20 is located at the normal position. Similarly, the distance-shortest scanning angle φ+α is a scanning angle defined when the laser sensor 20 detects the distance to become the shortest in a case that the laser sensor 20 is located at the abnormal position.

The distance-shortest scanning angle φ is equal to 90° for the normal position case shown in FIG. 9A, but the distance-shortest scanning angle φ+α becomes 110°, for example, for the abnormal position case shown in FIG. 9B. Thus, the mounting position of the laser sensor 20 can be determined to be normal or abnormal by determining the distance-shortest scanning angle to be 90° or not.

A deviation degree of the mounting position of the laser sensor 20 can be determined by a deviation of the distance-shortest scanning angle. The distance-shortest scanning angle φ of 90° corresponds to a standard scanning angle θ defined when the laser sensor 20 is mounted at the normal position. The standard scanning angle θ is stored in the memory 13.

When the laser sensor 20 is mounted at the normal position, a distance between the sensor 20 and a linear part such as a ground has a relationship shown in a broken curve line of FIG. 10 relative to the scanning angle. When the laser sensor 20 is mounted at the abnormal position, the distance has a relationship shown in a solid curve line of FIG. 10.

Therefore, the CPU 12 detects the distance-shortest scanning angle to have a value of φ, when the laser sensor 20 is mounted at the normal position. In contrast, the CPU 12 detects the distance-shortest scanning angle to have a value of φ+α, when the laser sensor 20 is mounted at the abnormal position. The CPU 12 controls the laser sensor 20 to scan the scanning plane, and detects a distance-shortest scanning angle based on an actual relationship between the distance and the scanning angle. The CPU 12 may correspond to an initializing portion.

Figure 11:
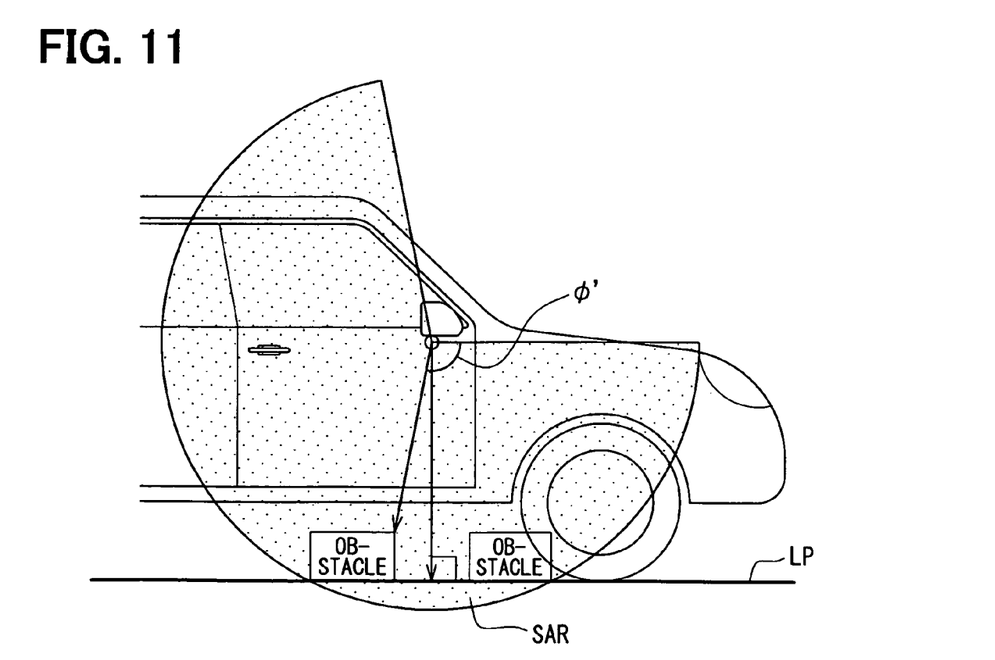
FIG. 11 is a side view illustrating a distance-shortest scanning angle when an obstacle exists on a ground.
Figure 12:
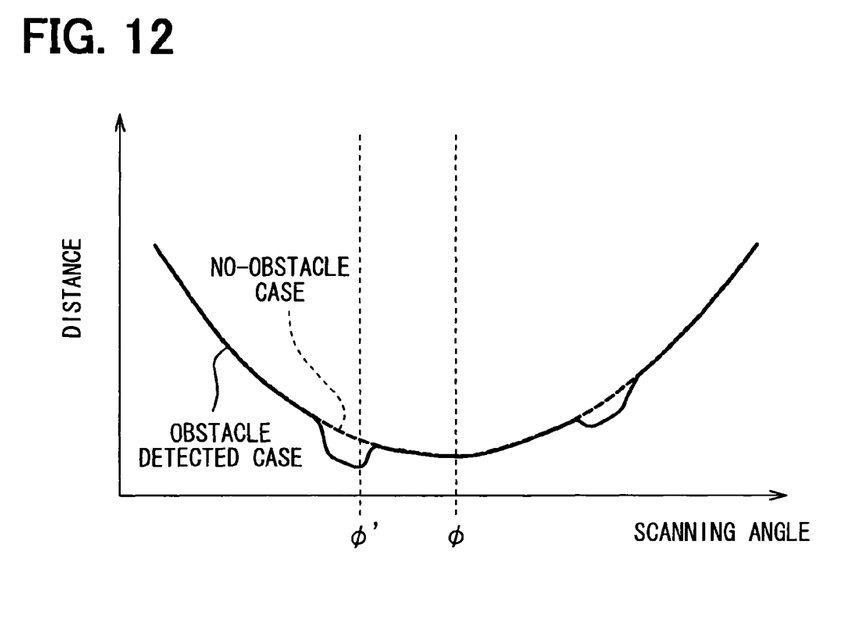
FIG. 12 is a graph illustrating a relationship between the scanning angle and the distance, in a no-obstacle case and in an obstacle-detected case.

The distance-shortest scanning angle may not always correspond to the vertical direction extending downward from the laser sensor 20. FIG. 11 shows a case in which an obstacle exists on a linear part LP such as a ground, and FIG. 12 shows an influence of the obstacle relative to the distance-shortest scanning angle. As shown in FIGS. 11 and 12, when the obstacle is located on the linear part LP, a distance detected by the laser sensor 20 may become the shortest between the laser sensor 20 and the obstacle. In this case, the distance-shortest scanning angle φ' does not correspond to the vertical direction extending downward from the laser sensor 20. Further, if the ground has a projection, the distance-shortest scanning angle may not correspond to the vertical direction extending downward from the laser sensor 20.

The CPU 12 determines the distance measured by the sensor 20 to have a relationship shown in a broken line of FIG. 12 or not. That is, the CPU 12 determines the detected object to have a linear part having a predetermined length or not. When the distance measured by the sensor 20 has the relationship shown in the broken line of FIG. 12, the linear part LP is determined to have no obstacle, and the detected object is determined to have the linear part LP having the predetermined length. In this case, the CPU 12 obtains the distance-shortest scanning angle φ.

In contrast, when the distance measured by the sensor 20 does not have the relationship shown in the broken line of FIG. 12, the linear part LP is determined to have an obstacle, and the detected object is determined not to have the linear part having the predetermined length. In this case, the CPU 12 obtains the distance-shortest scanning angle φ' different from 90°. The CPU 12 may correspond to a linear part determining portion. The predetermined length is set in a manner that the detected object can be determined to have the obstacle having the contacting possibility or the linear part.

The CPU 12 determines the obtained distance-shortest scanning angle φ to be equal to the standard scanning angle θ or not. When the distance-shortest scanning angle φ is equal to the standard scanning angle θ, the laser sensor 20 is determined to be mounted at the normal position. In this case, the CPU 12 extracts a comparison distance L corresponding to the scanning angle θ from the memory 13, and compares an actual distance X and the comparison distance L with each other.

In contrast, when the distance-shortest scanning angle φ is different from the standard scanning angle θ, the laser sensor 20 is determined to be mounted at the abnormal position. In this case, the CPU 12 corrects the scanning angle θ by using the distance-shortest scanning angle φ. The CPU 12 extracts a comparison distance L' corresponding to the corrected scanning angle θ' from the memory 13, and compares an actual distance X and the comparison distance L' with each other. The CPU 12 may correspond to a correcting portion.

A correcting process performed by the device 1 will be described with reference to FIGS. 13 and 14. The correcting process is performed relative to a vertical scanning.

Figure 13:
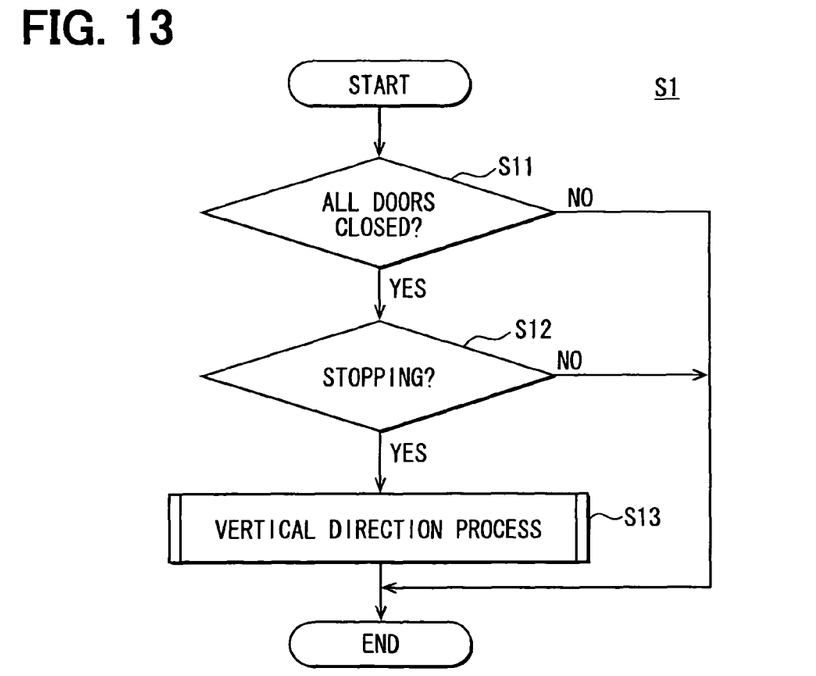
FIG. 13 is a flowchart illustrating a main routine of a vertical plane scanning performed by the device.

As shown in FIG. 13, when a main routine S1 of the vertical scanning is started, the ECU 10 determines all of the doors 50 to be closed or not based on a detection signal output from the opening sensor 40, at S11. When at least one of the doors 50 is determined to be opened (NO at S11), the ECU finishes the main routine S1. In contrast, when all of the doors 50 are determined to be closed (YES at S11), the ECU 10 performs S12.

The ECU 10 determines a speed of the vehicle to be zero or not based on a speed signal output from the speed sensor 30, at S12. When the speed is different from zero (NO at S12), the vehicle is determined to be driving, and the ECU 10 finishes the main routine S1. In contrast, when the speed is equal to zero (YES at S12), the vehicle is determined to be in a stop state, and the ECU 10 performs a vertical direction process S13.

Figure 14:
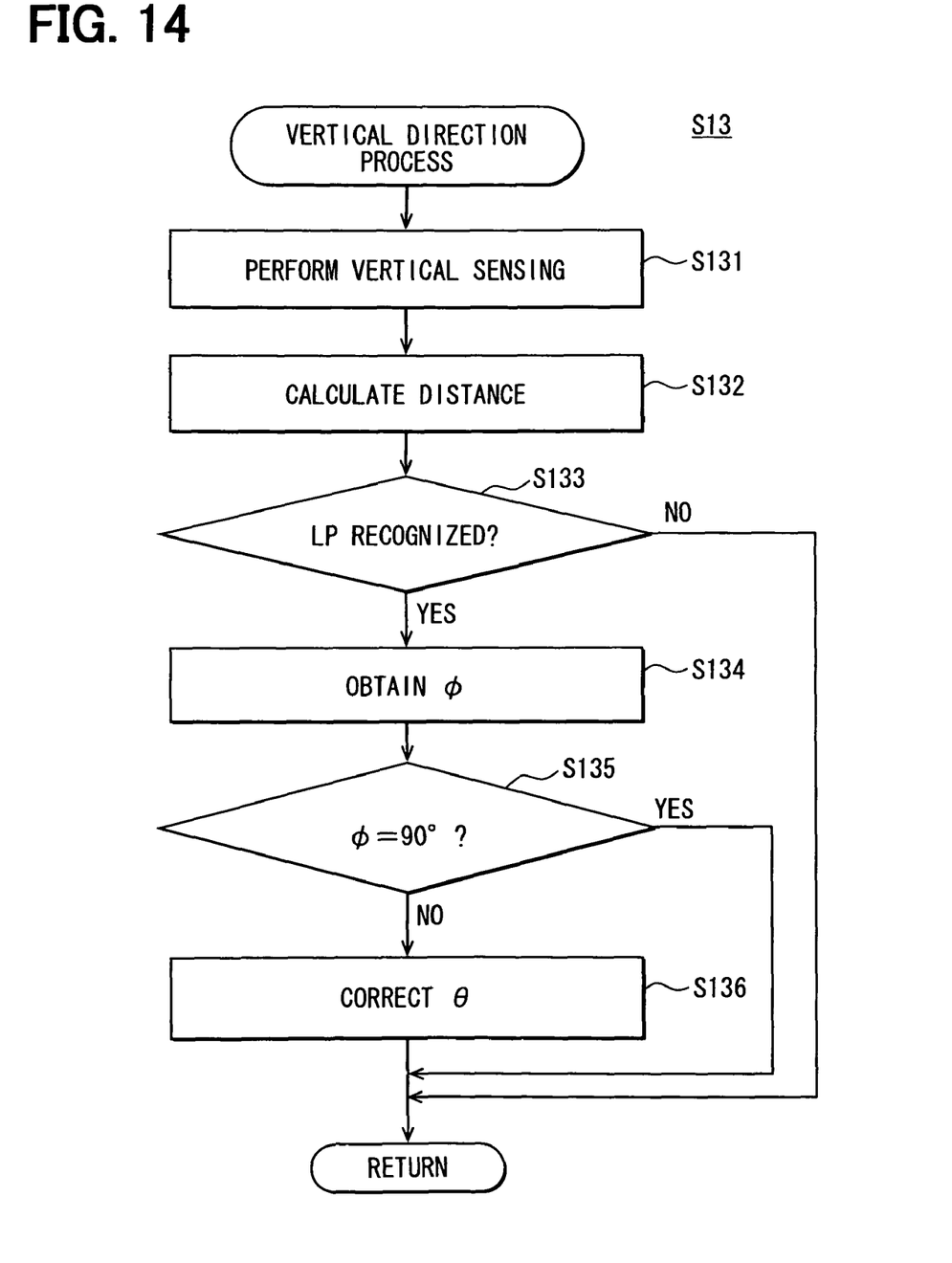
FIG. 14 is a flowchart illustrating a sub routine of the vertical plane scanning.

The vertical direction process S13 is constructed by a sub routine shown in FIG. 14. The ECU 10 performs a vertical sensing of the scanning plane by using the laser sensor 20, at S131. The ECU 10 calculates a distance between the laser sensor 20 and an object, at S132. The detected object is determined to have a liner part LP or not, at S133. That is, the liner part LP is determined to be recognized or not, at S133. Specifically, the sensor 20 is determined to have a relationship shown in the broken line of FIG. 12 or not, at S133.

When the linear part LP is not recognized (NO at S133), an obstacle is determined to exist on the ground. In this case, the ECU 10 finishes the sub routine S13 and the main routine S1. In contrast, when the linear part LP is recognized (YES at S133), the ground is determined to have no obstacle. In this case, the ECU 10 obtains a distance-shortest scanning angle φ, at S134.

The ECU 10 determines the distance-shortest scanning angle φ to be equal to the standard scanning angle of 90° or not, at S135. When the distance-shortest scanning angle is determined to be equal to the standard scanning angle (YES at S135), the laser sensor 20 is determined to be mounted at the normal position. In this case, the ECU 10 finishes the sub routine S13 and the main routine S1. The ECU 10 extracts the comparison distance L corresponding to the scanning angle θ from the memory 13, and compares an actual distance X and the extracted comparison distance L with each other. Thus, the object can be determined to be located in the movable area of the door 50 or not.

In contrast, when the distance-shortest scanning angle is determined to be different from the standard scanning angle (NO at S135), the laser sensor 20 is determined to be mounted at the abnormal position. In this case, the ECU 10 corrects the scanning angle θ by using the distance-shortest scanning angle, at S136. The ECU 10 finishes the sub routine S13 and the main routine S1. The ECU 10 extracts a comparison distance L' corresponding to the corrected scanning angle θ' from the memory 13, and compares an actual distance X and the comparison distance L' with each other. Thus, the object can be determined to be located in the movable area of the door 50.

According to the first embodiment, the ECU 10 performs a vertical scanning initialization, in which the distance-shortest scanning angle is obtained. The distance-shortest scanning angle is a scanning angle in which a distance to an object detected by the laser sensor 20 becomes the shortest. The ECU 10 corrects the scanning angle based on a difference between the distance-shortest scanning angle and the standard scanning angle stored in the memory 13. The ECU 10 determines the detected object to be an obstacle having the contacting possibility relative to the vehicle door 50, when the measured distance is equal to or smaller than a comparison distance corresponding to the corrected scanning angle. Accordingly, detection accuracy can be maintained high, because the scanning angle is corrected even when the mounting position of the laser sensor 20 deviates from a target position.

Second Embodiment

An obstacle detecting device according to a second embodiment will be described with reference to FIGS. 15, 16, 17 and 18.

The scanning plane of the laser sensor 20 has the predetermined angle β relative to the surface of the door 50 in the door opening direction, in the first embodiment. In contrast, a scanning plane of a laser sensor 20 is approximately parallel to a driving plane of a vehicle, in the second embodiment.

Figure 15:
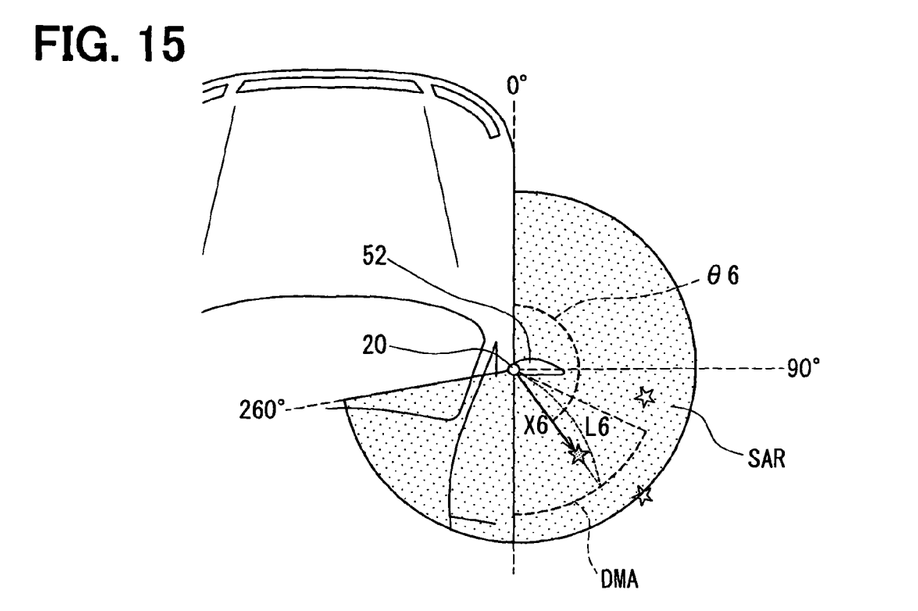
FIG. 15 is a plan view illustrating a horizontal scanning area of a laser sensor of an obstacle detecting device according to a second embodiment.

As shown in FIG. 15, the laser sensor 20 is mounted at a normal position of a lower part of a mirror 52 of a door 50 of the vehicle. The normal position is defined in a manner that a vehicle forward direction corresponds to a scanning angle of 0°, that a direction extending outward in a width direction of the vehicle from the laser sensor 20 corresponds to a scanning angle of 90°, and that a direction extending toward an approximately center position of the vehicle from the laser sensor 20 corresponds to the scanning angle 260°.

The scanning angle of 0° represents a start position of a scanning of the laser sensor 20, and the scanning angle of 260° represents an end position of the scanning of the laser sensor 20. Laser light is repeatedly emitted by a plural number of step angles θx clockwise from the start position to the end position. A scanning area SAR of the laser sensor 20 is defined by an area between the start position and the end position.

An object defined by a star mark having dot-pattern of FIG. 15 is detected in a scanning angle θ6, and the detected object is in a movable area DMA of the vehicle door 50. A calculated distance X6 is determined to be shorter than a comparison distance L6 extracted from the memory 13, when the distance X6 is compared with the distance L6. Therefore, the object is determined to be an obstacle having a possibility to contact with the door 50 in the scanning angle θ6.

Figure 16:
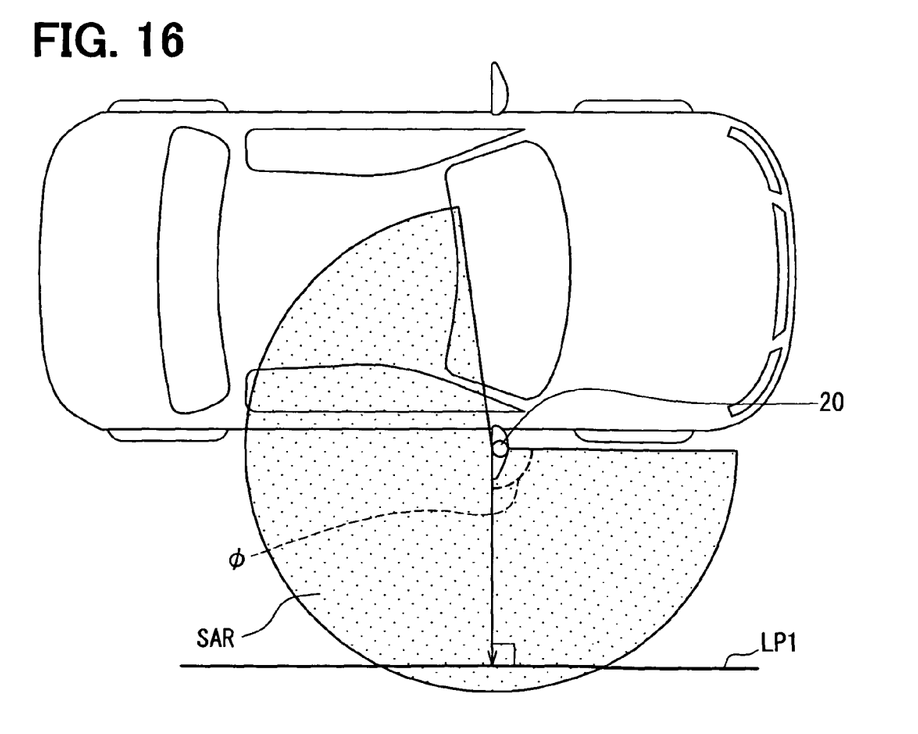
FIG. 16 is a plan view illustrating a distance-shortest scanning angle of the scanning area when the sensor is located at a normal position.

As shown in FIG. 16, a distance-shortest scanning angle φ is equal to 90°, when the sensor 20 is mounted at the normal position. In contrast, when the sensor 20 is mounted at an abnormal position (not shown), a distance-shortest scanning angle is different from 90° by an angle of α. Therefore, the sensor 20 can be determined to be mounted at the normal position or the abnormal position by determining the distance-shortest scanning angle to be 90° or not.

A deviating degree of the mounting position can be determined based on a deviation of the distance-shortest scanning angle from 90°. In the second embodiment, when the sensor 20 is mounted at the normal position, the distance-shortest scanning angle of 90° of the horizontal plane is defined as a standard scanning angle. The standard scanning angle is stored in the memory 13.

When the sensor 20 is mounted at the normal position, the sensor 20 calculates a distance between the mounting position of the sensor 20 and a linear part LP1 shown in FIG. 16. The linear part LP1 is a wall approximately parallel to a surface of the door 50, for example. When the sensor 20 is mounted at the normal position, the calculated distance has a relationship show in the broken curve of FIG. 10. In contrast, when the sensor 20 is mounted at the abnormal position, the calculated distance has a relationship show in the solid curve of FIG. 10.

Therefore, the CPU 12 detects the distance-shortest scanning angle to have a value of φ, when the laser sensor 20 is mounted at the normal position. In contrast, the CPU 12 detects the distance-shortest scanning angle to have a value of φ+α, when the laser sensor 20 is mounted at the abnormal position. The CPU 12 controls the laser sensor 20 to scan the scanning plane, and detects the distance-shortest scanning angle based on an actual relationship between the distance and the scanning angle.

Figure 17:
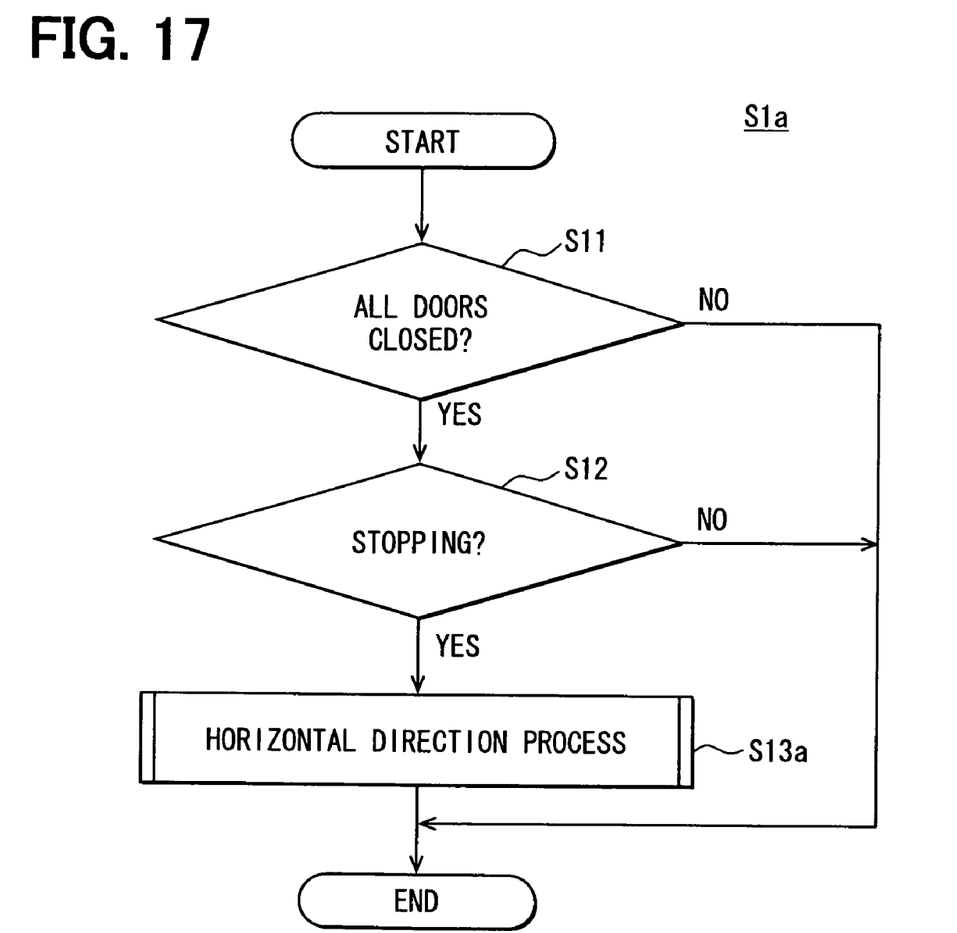
FIG. 17 is a flowchart illustrating a main routine of a horizontal plane scanning performed by the device.

As shown in FIG. 17, when a main routine S1a of a horizontal scanning is started, the ECU 10 determines all of the doors 50 to be closed or not based on a detection signal output from the opening sensor 40, at S11. Further, the ECU 10 determines a speed of the vehicle to be zero or not based on a speed signal output from the speed sensor 30, at S12. That is, the vehicle is determined to be driving or not, at S12. When at least one of the doors 50 is determined to be opened (NO at S11), or when the speed is determined to be different from zero (NO at S12), the ECU finishes the main routine S1. In contrast, when all of the doors 50 are determined to be closed (YES at S11), and when the speed is determined to be zero (YES at S12), the ECU 10 performs a process S13a.

Figure 18:
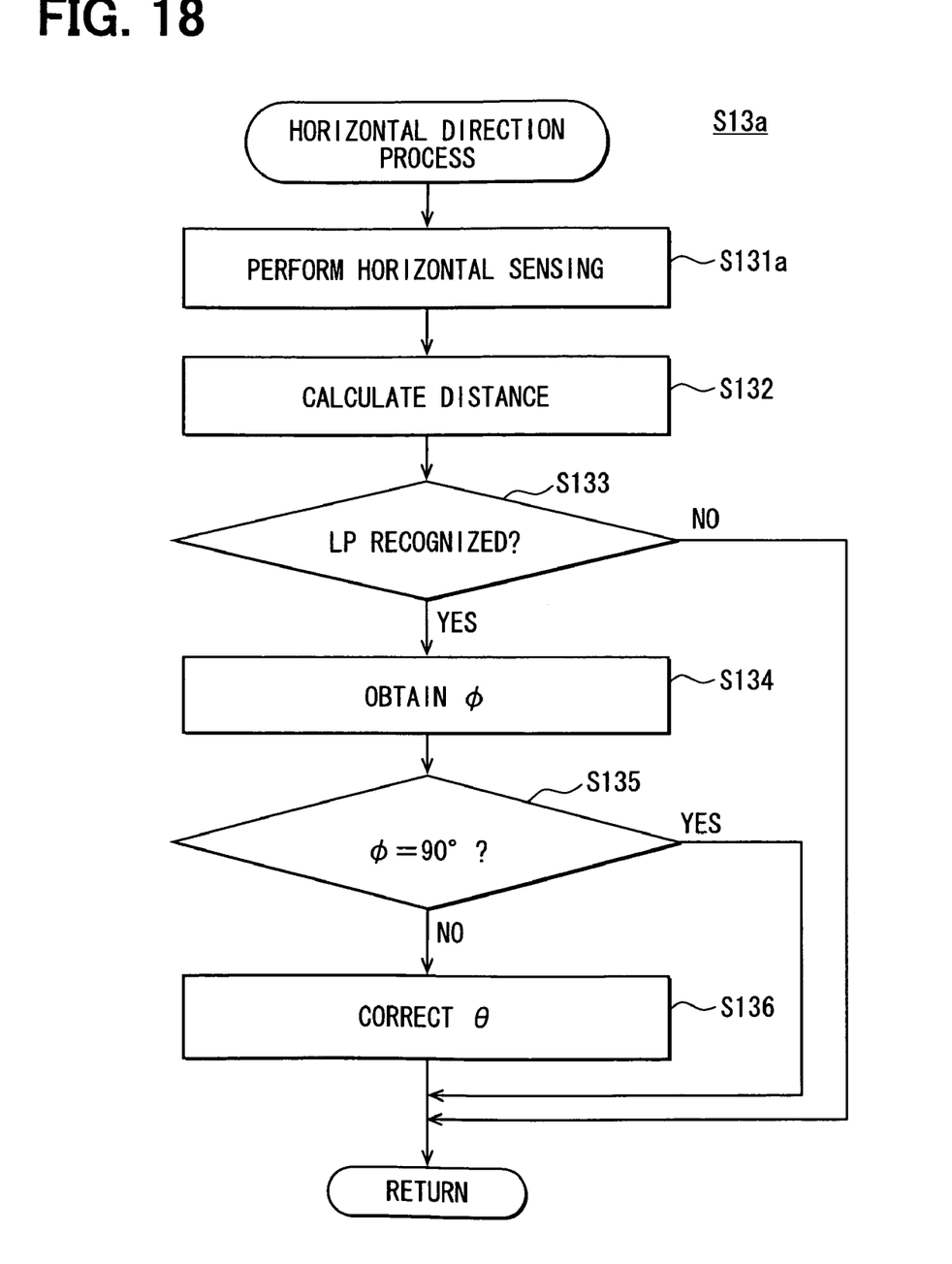
FIG. 18 is a flowchart illustrating a sub routine of the horizontal plane scanning.

The process S13a is constructed by a sub routine shown in FIG. 18. The ECU 10 performs a horizontal scanning of the scanning plane by using the laser sensor 20, at S131a. The ECU 10 calculates a distance between the laser sensor 20 and an object, at S132. The detected object is determined to have a liner part LP or not, at S133. That is, the liner part LP is determined to be recognized or not, at S133. Specifically, the sensor 20 is determined to have a relationship shown in the broken line of FIG. 12 or not, at S133. Because S133-S136 is similar to those of the first embodiment, description of S133-S136 is omitted.

According to the second, embodiment, the ECU 10 performs an initializing relative to the horizontal plane scanning so as to obtain the distance-shortest scanning angle φ defined by the shortest value of the measured distance X. The ECU 10 performs a correction to correct the standard scanning angle θ based on a difference between the obtained shortest scanning angle φ and the standard scanning angle θ. The ECU 10 determines the detected object to be an obstacle having a possibility to contact with the door, when the measured distance X is equal to or shorter than the comparison distance Ln corresponding to the corrected scanning angle θ'. Therefore, when the mounting position of the sensor 20 deviates from the target position, the standard scanning angle can be corrected. Thus, detection accuracy decreasing generated by the deviation of the mounting position of the sensor 20 can be restricted.

Figure 19:
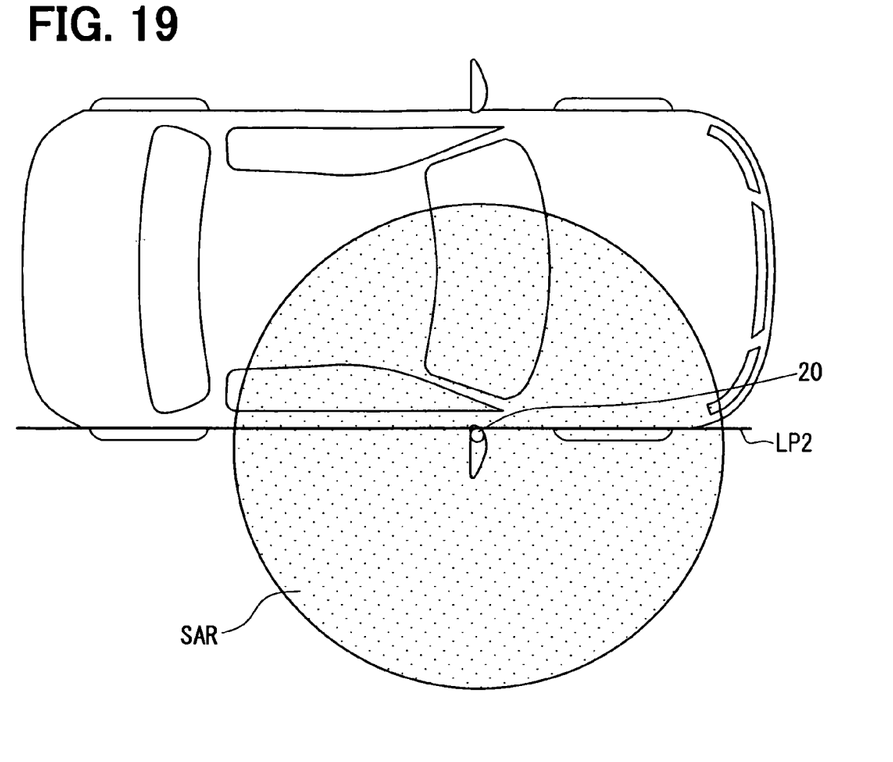
FIG. 19 is a plan view illustrating a horizontal scanning area of a laser sensor of an obstacle detecting device according to a modification of the second embodiment.
Figure 20:
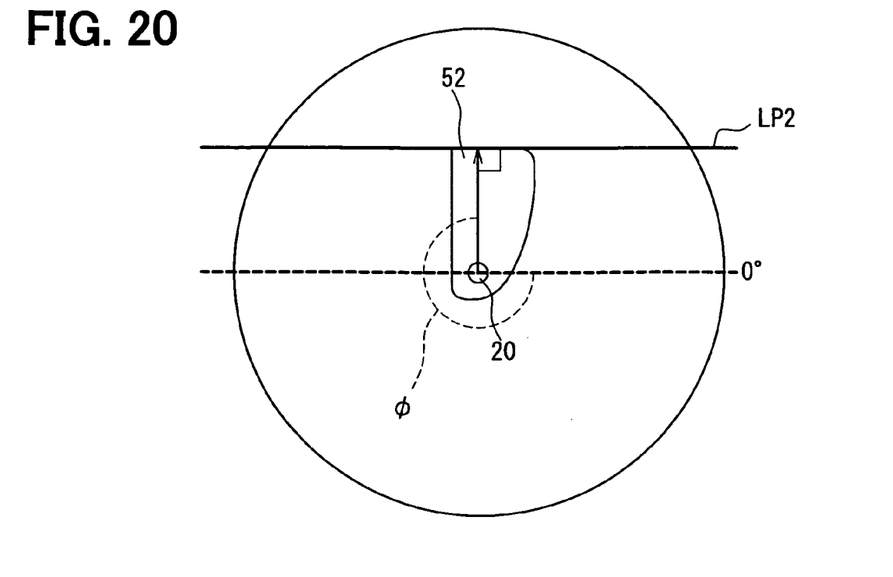
FIG. 20 is an enlarged view illustrating the sensor of FIG. 19.

In the second embodiment, the laser sensor 20 detect the wall parallel to the surface of the door 50, and the wall represents the linear part LP1. Alternatively, as shown in FIGS. 19 and 20, the laser sensor 20 may detect a surface of a vehicle chassis, and the surface of the vehicle chassis represents a linear part LP2.

Specifically, the laser sensor 20 has a scanning area SAR of 360°. The memory 13 stores the distance to the surface of the door 50 corresponding to the standard scanning angle indicating the directly lateral direction from the sensor 20 when the sensor 20 is mounted at the normal position.

The ECU 10 performs an initializing to obtain the distance-shortest scanning angle φ defined by the shortest value of the distance to the surface of the door measured by the sensor 20. The ECU 10 performs a correction to correct the standard scanning angle θ based on a difference between the obtained shortest scanning angle φ and the standard scanning angle θ stored in the memory 13. The ECU 10 determines the detected object to be an obstacle having a possibility to contact with the door 50 in an opening degree of the door 50 corresponding to the corrected scanning angle θ', when the measured distance X is equal to or shorter than the comparison distance Ln.

In this case, the laser sensor 20 is not limited to have the scanning area SAR of 360°. Alternatively, the laser sensor 20 may have a scanning area SAR smaller than 360°, if the surface of the door 50 is included in the scanning area SAR.

The initialization to obtain the distance-shortest scanning angle is performed only once in the above embodiments. However, the single initialization may include an error. Therefore, a plurality of the distances may be measured plural times, and the distance-shortest scanning angle may be obtained based on an average value of the plural measurements. Thus, detection error of the distance-shortest scanning angle can be reduced.

The distance measuring sensor to measure a distance to an object by scanning the scanning plane is not limited to the laser sensor 20.

The obstacle detecting device is used for determining the detected object to be an obstacle having a possibility to contact the door 50. Further, the obstacle detecting device may be used in a door controlling apparatus. The apparatus has a motor to control an opening degree of the door 50. The opening degree of the door 50 is limited, when the ECU 10 determines the detected object to be an obstacle having a possibility to contact the door 50. Thus, a collision between the door 50 and the obstacle can be prevented.

Such changes and modifications are to be understood as being within the scope of the present invention as defined by the appended claims.

The invention claimed is:

1. An obstacle detecting device comprising:
   a distance measuring sensor arranged adjacent to a rotation axis of a door of a vehicle, the sensor measuring a distance to an object in a direction corresponding to a scanning angle by scanning a scanning plane;
   a memory to store
      a standard angle defined when the sensor is mounted at a normal position, and
      a comparison distance defined between a mounting position of the sensor and an end of the door in the direction corresponding to the scanning angle when the sensor is mounted at the normal position;
   an initializing portion to obtain a distance-shortest scanning angle defined by a shortest value of measured distance distances which are measured by the distance measuring sensor;
   a correcting portion to correct the scanning angle, when the distance-shortest scanning angle is different from the standard angle; and
   an object determining portion to determine the object to be an obstacle having a possibility to contact with the door, when a distance measured by the sensor measuring sensor is equal to or shorter than a corrected comparison distance which is defined by correcting the comparison distance to correspond to the corrected scanning angle.

2. The obstacle detecting device according to claim 1, wherein
   the scanning plane has a predetermined angle relative to a surface of the door in an opening direction of the door, and
   the standard angle is defined in a direction extending vertically downward from the sensor.

3. The obstacle detecting device according to claim 1, wherein
   the scanning plane is approximately parallel to a driving plane of the vehicle,
   the standard angle is defined in a directly lateral direction of the sensor, and
   the object determining portion determines the obstacle to have the possibility to contact with the door, when the door has an opening degree corresponding to the corrected scanning angle.

4. The obstacle detecting device according to claim 3, wherein
   the object is a surface of the door located in the directly lateral direction of the sensor,
   the comparison distance is defined between the mounting position of the sensor and the surface of the door in the directly lateral direction, and
   the distance-shortest scanning angle is defined by a shortest value of the measured distance between the mounting position of the sensor and the surface of the door.

5. The obstacle detecting device according to claim 1, further comprising:
   a linear part determining portion to determine the object to have a linear part having a predetermined length or not based on the distance to the object, wherein
   the initializing portion obtains the distance-shortest scanning angle, when the object is determined to have the linear part having the predetermined length.

6. The obstacle detecting device according to claim 1, wherein
   the distance to the object is one of a plurality of distances measured by the sensor, and
   the distance-shortest scanning angle is obtained by using an average value of the plurality of distances.

7. The obstacle detecting device according to claim 1, wherein
   the vehicle has a plurality of doors, and
   the initializing portion obtains the distance-shortest scanning angle, when all of the plurality of doors are determined to be closed.

8. The obstacle detecting device according to claim 1, wherein,
   the initializing portion obtains the distance-shortest scanning angle, when the vehicle is determined to be in a stop state.

9. The obstacle detecting device according to claim 1, further comprising a position determining portion determining if the sensor is not mounted at the normal position.

* * * * *